Fig. 1.

R. B. DOW.
SAW FORMING AND SHARPENING MACHINE.
APPLICATION FILED JULY 18, 1908.

1,040,905.

Patented Oct. 8, 1912.

UNITED STATES PATENT OFFICE.

ROY B. DOW, OF ROCHESTER, NEW YORK, ASSIGNOR TO COCHRAN-BLY COMPANY, OF ROCHESTER, NEW YORK, A CORPORATION OF NEW YORK.

SAW FORMING AND SHARPENING MACHINE.

1,040,905.     Specification of Letters Patent.     Patented Oct. 8, 1912.

Application filed July 18, 1908. Serial No. 444,164.

*To all whom it may concern:*

Be it known that I, ROY B. DOW, of Rochester, in the county of Monroe and State of New York, have invented certain new and useful Improvements in Saw Forming and Sharpening Machines; and I do hereby declare the following to be a full, clear, and exact description of the same, reference being had to the accompanying drawings, forming a part of the specification, and to the reference-numerals marked thereon.

The present invention relates to saw forming and sharpening machines and it has for an object to provide a construction which will lessen the labor in forming and sharpening saws and will secure greater accuracy in operation in order that a destruction of the saw teeth will not take place.

To these and other ends the invention consists in certain improvements and combinations of parts all as will be hereinafter more fully described, the novel features being pointed out in the claims at the end of the specification.

In the drawings.

Similar reference numerals in the several figures indicate similar parts.

Figures 3, 12, 13, 14, 16, 17:
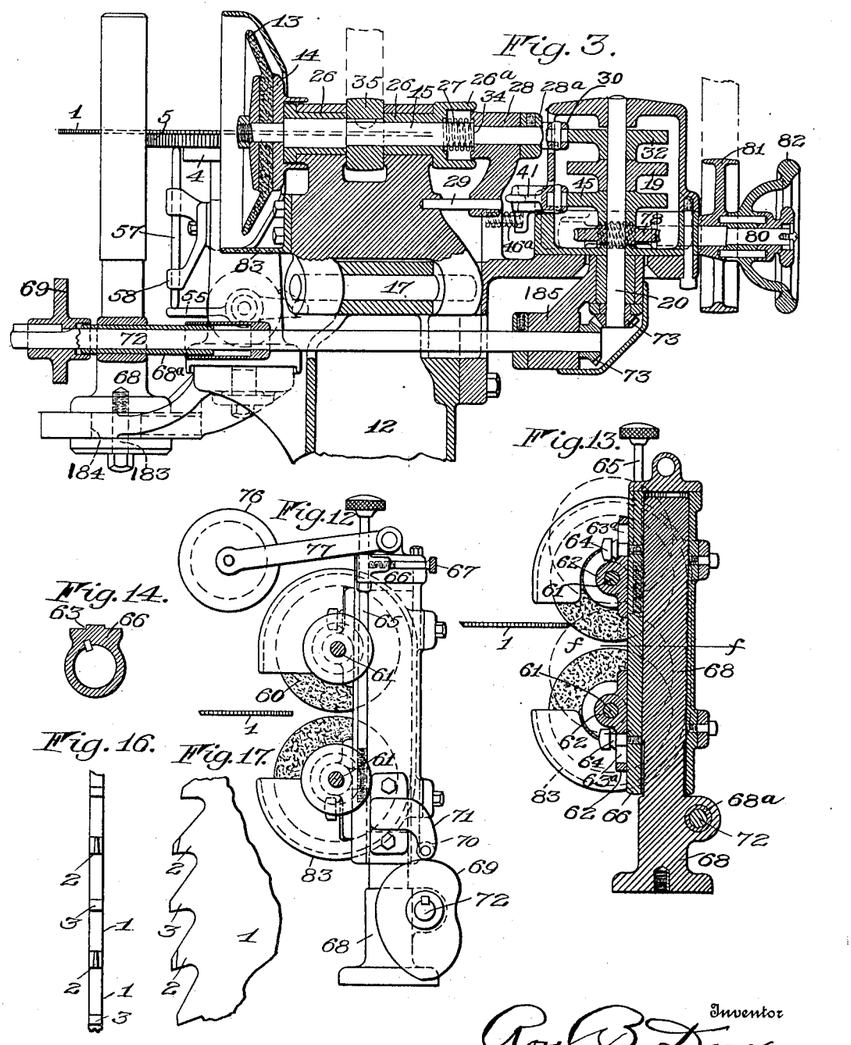
Fig. 3 is a vertical section on line $b$—$b$ of Figs. 1 and 2.
Figs. 11 and 12 are front and side views respectively of the beveling mechanism.
Fig. 13 is a section on the line $e$—$e$ of Fig. 1.
Fig. 14 is a section on the line $f$—$f$ of Fig. 13.
Figs. 16 and 17 are detail views of the saw.
Figure 4:
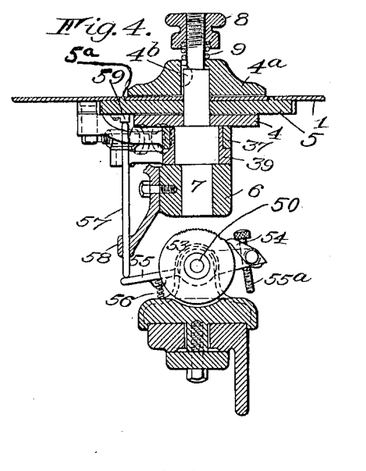
Fig. 4 is a vertical section on line $c$—$c$ of Fig. 2.

The present embodiment of my invention is designed for sharpening and forming metal cutting saws of the type illustrated in Figs. 16 and 17 and comprises a circular plate 1 having alternate teeth 2 beveled or chamfered at their ends on opposite sides and slightly longer than the teeth 3 which have flat ends. Heretofore, when saws of this type have been employed, the sharpening has been effected by a grinding disk whose edge must at all times be maintained in a certain condition, thus requiring the sharpening of the grinding disk as well as the saw. Further, the grinding machines employed have only sharpened the teeth which are originally formed by the saw manufacturer, and when these teeth have been ground to a certain point the saws have been sent to the manufacturer, for the formation of new teeth. With this invention it is not only possible to form the teeth on saws of this type in the first instance, but the teeth may be maintained until the stock of the saw has been practically used up, and this without the necessity of sharpening the grinding disk.

In the form of the invention herein shown, the saw 1 is mounted on a saw support 5 which is rotatably mounted on a spindle or stub shaft 7 that is rigidly secured to and projects upwardly from a slide 6. The saw support has upwardly extending pins $5^a$ which enter openings in the saw to cause the latter to turn therewith. In order to retard the rotation of the saw and its support I may employ two braking or retarding disks 4 and $4^a$ having their opposed faces covered with any suitable friction producing material. The disk 4 is rigidly secured to spindle 7 below the rotary support while the disk $4^a$ is keyed to the spindle at $4^b$ but is removable therefrom, being yieldingly held against the saw by a spring 9 which bears against the disk $4^a$ at one end and against a thumb nut 8 at its other end threaded onto the spindle.

The slide 6 is movable on a guideway 10 formed on an arm 11 that is bolted to the frame or pedestal 12 of the machine, and mechanism to be hereinafter described moves the slide toward the grinding mechanism. This grinding mechanism embodies preferably a rotary tooth shaping or grinding disk 13 of cup or concavo-convex formation secured between two clamping plates 14 to one end of a shaft or spindle 15, that may be driven by a pulley 35. This spindle is mounted to shift axially and also laterally so that the grinding disk may move to make an undercut in the saw 1.

Figure 9:
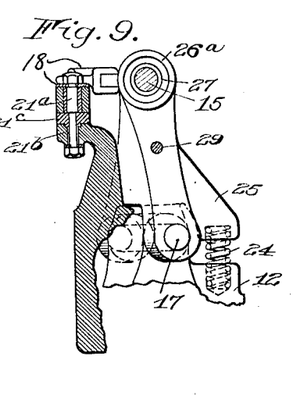
Figure 10:
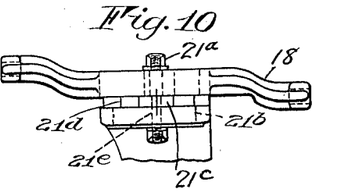
Figure 11:
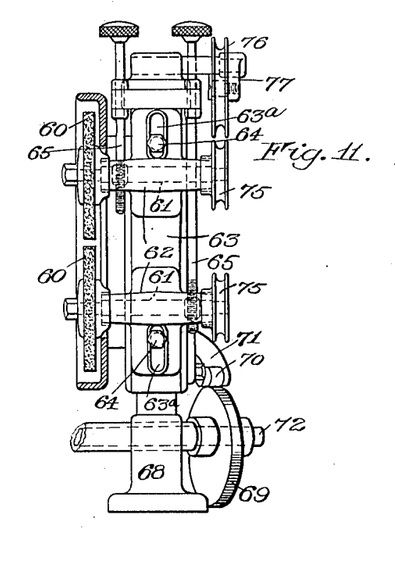
Figure 15:
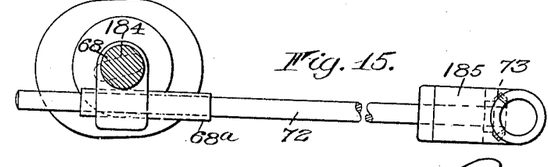
Fig. 15 is a detail view of the shifting means for the beveling mechanism.

The lateral movement of the spindle may be effected by mounting the latter on a swinging frame 16 turning about an axis 17 preferably horizontally arranged at an angle to the axis of the spindle in order that the undercut of the teeth will be obtained. This frame may be moved by a lever 18 pivoted between its ends on a shiftable fulcrum. The shifting fulcrum is preferably in the form of a clamping bolt $21^a$ working in slots $21^b$ in the main frame of the machine and in the lever 18 and carried by a plate $21^c$ arranged between these parts (Figs. 9 and 10). This plate is provided with marks $21^d$ which are adapted to be alined with marks $21^e$ on the lever and on the main frame in order to determine the depth of the teeth to be cut. One end of the lever 18 bears against the frame while its other end bears against a cam 19 arranged on a cam shaft 20 that in this instance is vertically disposed on the frame of the machine. The cam has two different kinds of surfaces, one of which is indicated by 22 and serves to cause a movement of the guides to form the space between the teeth, and the other of which indicated by 23 effects a movement to trim the apexes of the teeth, one of the surfaces 23 being reduced very slightly in order that every alternate tooth will be longer than those between them. A spring 24 arranged beneath an arm 25 on frame 16 moves the latter in a direction opposed to the direction of movement effected by the cam 19.

Figures 5, 6, 7:
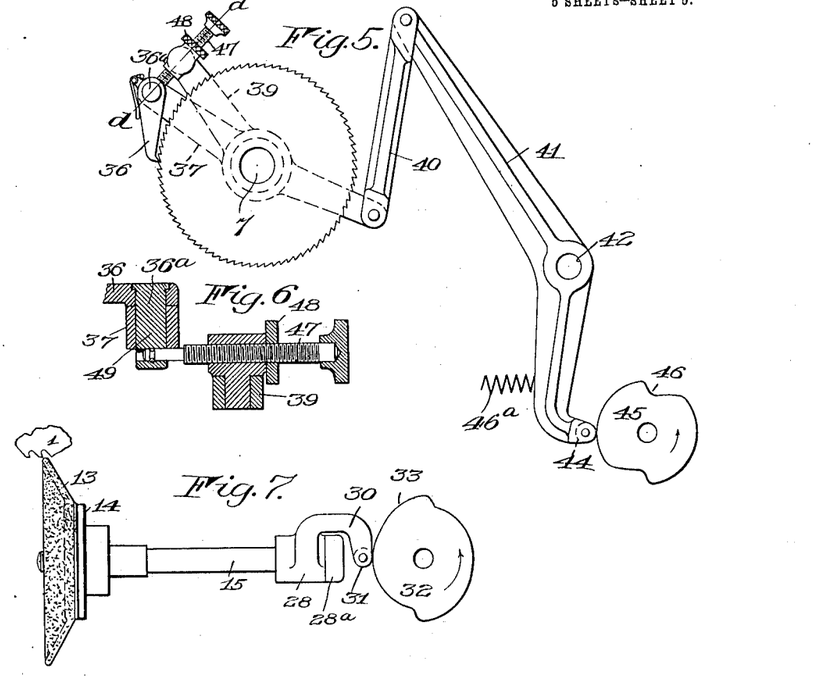
Fig. 5 is a detail view of the mechanism for rotating the saw-support.
Fig. 6 is a section on line $d$—$d$ of Fig. 5.
Fig. 7 is a detail view of the mechanism for moving the tooth shaping or forming grinder to trim the apexes of the teeth.
Figure 8:
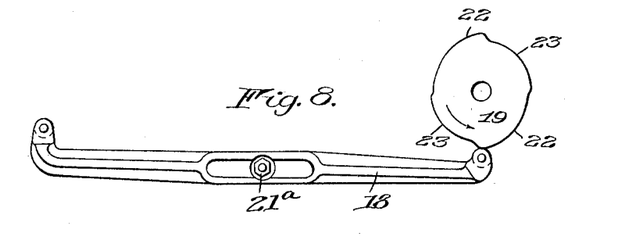
Figs. 8, 9 and 10 are detail views of the mechanism for moving the said grinder to cut the spaces between the teeth, Fig. 9 being a section on line $g$—$g$ of Fig. 1.

The spindle 15 is arranged to move axially through spaced bearing pieces or sleeves 26 which are secured in frame 16 on opposite sides of the pulley 35, and also through the latter, which, however, is keyed thereto. The normal position of the shaft is maintained by a coil spring 27 surrounding it and bearing at one end against one of the sleeves and at its other end against a slide 28, the spring being inclosed by an extension $26^a$ on one of the sleeves, overlapping the slide. The slide 28 is guided on the frame at 29 and has the spindle turning therein, a stop $28^a$ on the spindle limiting the outward movement of the slide. An arm 30 (Fig. 7) projects from the slide and carries a roller 31 which coöperates with a cam 32 arranged on cam shaft 20, and this cam has surfaces 33 which cause the slide 28 to move in the direction of the axis of the spindle 15 and to engage annular shoulder 34 thereon to effect the axial movement of the spindle. This axial movement takes place after the grinder has been moved to form a space between two teeth and while it is being held in position to trim the apexes, thus causing the grinder to move along an apex while grinding the latter.

Of course after the trimming of each apex the saw-support must be rotated or shifted, periodically or step-by-step, one tooth. This I may effect by any suitable mechanism and as a preferred construction I form the edge of the rotary support 5 into a ratchet or toothed wheel with which coöperates a spring pressed pawl 36 pivoted at $36^a$ to an arm 37 which is journaled on the spindle or shaft 7 by which the ratchet wheel is carried, so that the arm and the ratchet wheel turn about coincident axes. This arm is adjustably connected in a manner to be described to a swinging member 39 turning about the same axis by also being mounted to turn on the bearing of arm 37, and the swinging member is connected by a link 40 with one end of a lever 41 that is pivoted at 42 to an arm 43 projecting from the frame of the machine, the other end of the lever carrying a roller 44 coöperating with a cam 45 also arranged on cam shaft 20. This cam 45 has two notches 46, one wall of which permits the lever 41, to swing under the action of a spring $46^a$ to effect the movement of the pawl in one direction, and the other wall moves the pawl to effect the rotation or shifting of the saw. A stop $41^a$ may coöperate with lever 41 to limit its movement under action of spring $46^a$ which actuates the lever 41 in one direction.

An adjustable connection between the pawl carrying member 37 and the swinging member 39 serves as a means for properly positioning the spaces between the teeth relatively to the grinder, that is, the saw may be shifted independently of the shifting mechanism. This means may comprise a screw 47 working in a nut 48 journaled on the swinging member and turning in a pin 49 journaled on the pawl carrying member 37, and holding the pawl in place. By this means the member 37 is swung relatively to the member 39 causing the dog to swing the saw.

After the saw has made a complete rotation, it is necessary that it be fed toward the grinder in order that the latter may cut deeper. This may be effected by a mechanism comprising preferably a screw 50 adapted to be operated manually by a hand piece 51, journaled in the slide 6 and working through a nut 52 rigid with the frame. This screw may also be operated automatically on every complete rotation of the saw and this is preferably accomplished by providing the screw with a ratchet wheel 53 with which coöperates a spring actuated pawl 54 on a swinging member 55 that is journaled on the screw. Swinging member 55 is moved in one direction by a spring 56 and is moved in the other direction by a slide bar 57 that is movable in guides 58 and is operated by a cam 59 on the under surface of the rotary disk 5. An adjustable stop 55ª varies the feeding movement of pawl 54.

The pawl 36 moves with the oscillatory member 39 and the latter, it will be remembered, is swung by the links 40 and lever 41. The pivot of the member 39 is the stud 7, and this is carried on the slide 6 which moves inwardly as the diameter of the saw is reduced. Now, it will be seen that since the lever 41 is connected to a fixed part of the machine at its pivot 42, the end of the member 39, which is connected to the pawl, will be rotated on the stud 7 toward or from the grinder upon advancing and retracting the slide 6. The machine is automatic in its operation and a large saw may in time be reduced to a small one without arresting the grinding operation. At first, when the carrier is adjusted for a large saw the amplitude of movement of the pawl 36 will be considerable, but as the diameter of the saw lessens, and the carriage approaches the grinder, the swinging movement of the pawl decreases. The shifting of the pivot of the member 39 with the adjusting of the saw support automatically determines the initial position of the member 39 and the pawl 36 in respect to the saw support so that when the latter is adjusted, the other parts are also properly positioned, whether the saw be large or small in diameter. After this initial adjustment, the feeding movement of the parts, occurring when the saw makes a complete revolution, is automatically accomplished.

The guide on which the feeding mechanism shifts the slide 6 is arranged obliquely to the axis of the rotary grinder, and when the slide is shifted the lever 41 being held against movement by cam 45 causes the link 40 to pull on swinging member 39 thus effecting a shifting or a generating movement of the saw to correspond to the feeding movement. This movement is in the direction toward the grinder 13 and in the direction of the cutting action of the saw teeth, so that the edge of the grinder in deepening the throat of each tooth also removes a portion of the front edge of the tooth with the consequent result that the widths of the tops of the teeth, which are subsequently trimmed by the grinder, remain constant even though the diameter of the saw blank is lessened upon each grinding operation to which the saw is subjected.

As before stated every other tooth of the saw is beveled on both sides and to secure this result I may employ a pair of grinders 60 arranged in the same plane and operating on opposite sides of the saw. These grinders are preferably in the form of rotary flat disks secured to spindles 61 that turn in bearing pieces 62, which are adjustable toward and from each other on a slide 66 so that the bevel on the teeth may be decreased or increased. In order that this adjustment may be effected the bearing pieces move on guides 63 and are slotted at 63ª, headed studs 64 working in the slots to guide said bearing pieces. Each bearing piece also has an adjusting screw 65 connected thereto and journaled in the slide 66, while set screws 67 (Fig. 12) hold the adjusting screws against accidental turning.

The bevel grinders 60 may be driven by a belt passing about pulleys 75 on spindles 61 and about a pulley 76 mounted on an arm 77 pivotally supported on the slide 66 in order that the position of the slide will not effect the action of the belt.

The slide 66 moves on a post 68 in a plane transverse to the plane of the saw and this movement may be effected by a cam 69 which coöperates with roller 70 on an arm 71. This cam is carried by a shaft 72, which turns in a sleeve 68ª and by gearing 73 is connected to the cam shaft 20. The cam is so formed that every rotation thereof causes the depression of the upper grinder (Fig. 13) into engagement with a tooth, the elevation of the lower grinder into engagement with the same tooth, and then the movement of the grinders to an intermediate position so that the next tooth may pass them without being operated upon.

As saws of different diameters are adapted to be sharpened and cut by this machine the beveling grinders must be shifted to correspond to the diameter of the saw to be cut. This may be effected by shifting the post 68 which for this purpose carries a bolt 183 working in a slot 184 in an arm on the main frame. The shaft 72 being journaled in a bracket 185 which turns about cam shaft 20 as an axis, and the slot 184 being arranged at a certain angle to the guideway 10 not only causes the beveling grinders to move away from the axis of the saw but causes them to turn slightly to assume the proper position for cutting the bevel on the saw, thus providing a simple arrangement of parts which may be quickly adjusted to saws of different diameters.

The cam shaft 20 may be driven in any suitable manner but it is preferred to secure a worm wheel 78 thereto and gear with this wheel a worm 79 on shaft 80. This shaft has a pulley 81 thereon adapted to be connected thereto and disconnected therefrom by a suitable clutch 82.

Figure 1:
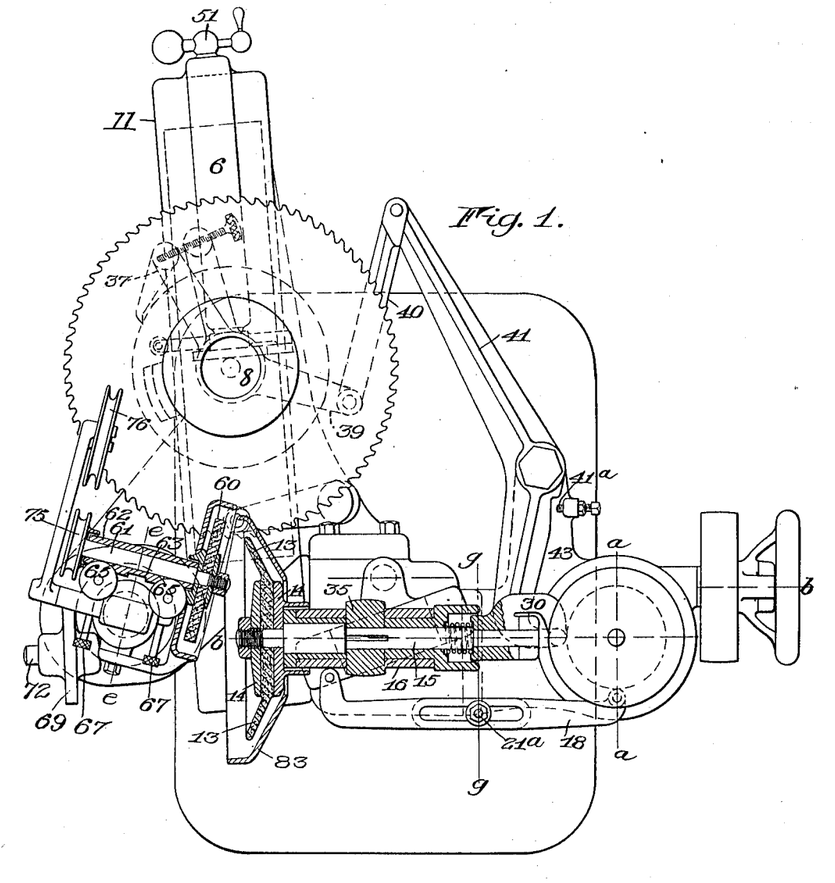
Figure 1 is a plan view of a machine constructed in accordance with this invention, parts being shown in horizontal section.
Figure 2:
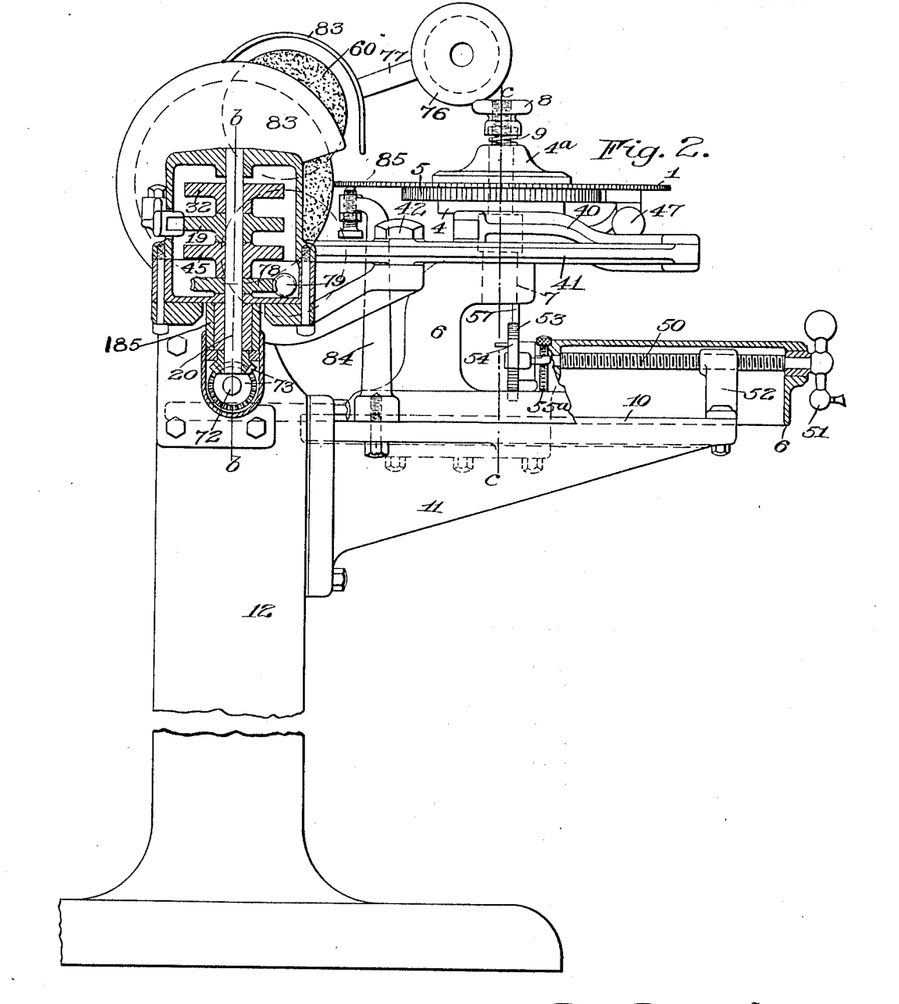
Fig. 2 is a side elevation with parts in vertical section on line $a$—$a$ of Fig. 1, the screw feeding mechanism being also shown in section.

Coöperating with the under surface of the saw in proximity to the bevel grinders is an adjustable support (Fig. 2) comprising a standard 84 and an adjustable screw 85 which are provided to maintain the saw in a true plane while being beveled.

In order to protect the machine against the destructive action of the filings, all of the bearings are inclosed, or incased, while the operator is protected by guards 83 which surround the grinders.

In operation, a saw is placed on the saw-support and the feed screw 50 is manually operated by hand piece 51 so that the saw lies in the field of movement of the tooth shaping or forming grinder 13. Should the grinder 13 not be positioned properly relatively to the teeth, the screw 47 is adjusted while the post 68 carrying the bevel grinders 60 is shifted to adjust the said grinders to the diameter of the saw, the depth of the teeth being regulated by shifting fulcrum 21$^a$. All parts of the machine being started to work, the grinder 13 will operate first in a space between two teeth and then in a direction to trim the apexes of the teeth, every other tooth being made longer than the others. These longer teeth are then beveled on opposite sides by the grinders 60 which move to an intermediate position during the rotary movement of the saw. After one complete rotation of the saw, it is fed toward the grinder 13 and this feeding imparts a generating movement to the saw. This generating movement is also given when the hand piece 51 is operated after once the relation between the saw and the grinder has been established.

A machine constructed in accordance with this invention reduces the labor of sharpening rotary saws. It makes it unnecessary to return the saws to the manufacturer as the saw teeth are maintained until the stock is practically entirely used. The machine is comparatively inexpensive to manufacture and the operation thereof is very simple.

What I claim is:

1. In a saw grinding machine, the combination with a grinder reciprocating within fixed limits, and an adjustable saw support, of devices for intermittently advancing a saw on such support to present its teeth successively to the action of the grinder, means acting upon the saw support and said advancing devices for moving the saw support toward the field of movement of the grinder upon a predetermined number of steps of the saw and simultaneously imparting to the saw an advance movement on the support in the direction of its cutting action.

2. In a saw grinding machine, the combination with a rotatable saw support, a grinder adapted to move into and out of the spaces between the teeth of a saw mounted on the support and means for advancing the support forwardly toward the grinder upon each complete rotation, and means coöperating with the support when it is so advanced to also rotate it slightly to position the saw thereon so that the grinder will dress one of the side faces of each tooth of the saw upon the continued rotation of the latter.

3. In a saw grinding machine, the combination with a support adapted to receive a circular saw, a grinder adapted to reciprocate into and out of the spaces between the saw teeth and means for intermittently rotating the saw to position a new tooth relatively to the grinder upon each reciprocation thereof, of means for automatically advancing the support toward the grinder upon each complete rotation of the saw, said means for advancing the support and the means for rotating the saw operating conjointly to rotate the saw into an advanced position so that the width of the teeth will be decreased by the grinder as the latter acts to decrease the diameter of the saw.

4. In a machine for grinding circular saws, the combination with a grinder mounted to reciprocate into and out of the spaces between the teeth of a saw mounted upon a support, and a revoluble saw support, of means for intermittently rotating the support to successively position the saw teeth relatively to the grinder, and means for carrying the axis of rotation of the support relatively toward the grinder upon each complete rotation thereof, said means of rotation acting to rotate the support slightly for advancing the position of the saw teeth upon the shifting of the axis of said support.

5. The combination with a tooth grinder and a saw support movable toward the grinder, of mechanism for rotating a saw on the support, having a portion mounted on the said support and a portion connected to a fixed part of the machine acting to impart a rotary movement to a saw on the support during the adjustment of the saw support relatively toward and from said grinder.

6. The combination with a saw tooth grinder, of a saw support movable toward the grinder, a pawl for effecting the rotation of a saw on said support, a movable member carrying the pawl and mounted for adjustment toward the grinder when the saw support is similarly adjusted and connection between said member and a fixed part of the machine for causing movement of the member to initially position it in respect to the saw support when said saw support is adjusted.

7. The combination with a tooth grinder and a rotary saw support movable toward the grinder and carrying a ratchet wheel, of a pawl coöperating with the ratchet wheel and movable toward the grinder upon adjustment of the saw support in the same direction, and mechanism for operating the pawl comprising a lever secured to a fixed part of the machine.

8. The combination with a tooth grinder, of a saw support movable toward the grinder, a pawl for effecting the rotation of the saw on the support, a swinging frame connected to the pawl and carried by the support, a link connected at one end to the frame, a lever pivoted independently of the work support and connected to the other end of the link, and mechanism for moving the lever.

9. The combination with a support for a circular saw, and a tooth grinder, of automatic mechanism for rotating a saw step by step on the support, automatic mechanism for effecting a relative to and fro movement between the saw support and the grinder after each step by step movement of the saw, and automatic mechanism for effecting a relative movement between the saw support and the grinder after each complete rotation of the saw.

10. The combination with a support for a circular saw and a tooth grinder, of automatic mechanism for rotating the saw step by step, automatic mechanism for effecting a relative to and fro movement between the saw support and the grinder after each step by step movement of the saw, mechanism for effecting a movement of the saw support toward the grinder, said mechanism being independent of the operation of the to and fro movement, and connection between a relatively fixed part and the step by step mechanism for causing the latter to produce movement of the saw in the direction of its teeth on the movement of the said saw toward the grinder.

11. In a saw tooth grinding machine, the combination with a support adapted to receive a circular saw, and a grinder, the former being adjustably fixed and the latter movable relatively toward and from it, of devices for continuously operating the grinder to carry it into and out of the spaces between adjacent saw teeth, devices for rotating the saw intermittently on its support, mechanism for moving the axis of the support toward the grinder upon each complete rotation of the saw and advancing the saw in the direction of its cutting movement to reduce the width of the teeth proportionately to the lessening of the diameter of the saw.

12. The combination with a tooth grinder and a saw support, mechanism for rotating a saw on the saw support step by step embodying a pawl carrying member mounted to swing about the axis of rotation of a saw on the support, a pawl on said carrying member, a swinging member also movable about the axis of rotation of the saw, an adjusting device connecting the pawl carrying member and the swinging member, and means for operating the swinging member.

13. The combination with a tooth grinder, and a rotatable saw support, of mechanism for rotating the saw support, mechanism for moving the tooth grinder to effect a shaping of the teeth on a saw on the support, a screw for feeding the saw support toward the tooth grinder, a ratchet wheel connected to said screw, a swinging member carrying a pawl to actuate the ratchet wheel, and a slide operated by the saw support on each complete rotation to move the pawl.

14. The combination with a rotary tooth grinder, and a saw support, of a frame on which the tooth grinder is journaled mounted to swing toward and from a saw on the support about an axis arranged at an oblique angle to the turning axis of the tooth grinder, mechanism for moving the saw step-by-step, and mechanism for swinging the frame after each step of the saw.

15. The combination with a rotary tooth grinder, and a saw support, of a frame on which the tooth grinder is journaled mounted to swing toward and from a saw on the support about an axis arranged at an oblique angle to the turning axis of the tooth grinder, mechanism for moving the saw step-by-step, mechanism for swinging the frame after each step of the saw, embodying a lever coöperating with the frame, a shiftable fulcrum for the lever, and means actuating the lever.

16. The combination with a rotary tooth grinder, and a saw support, of a frame on which the tooth grinder is journaled mounted to swing toward and from a saw on the support about an axis arranged at an oblique angle to the turning axis of the tooth grinder, mechanism for moving the saw step-by-step, and mechanism for swinging the frame after each step of the saw, embodying means for varying the swinging movement of the frame.

17. The combination with a rotary tooth grinder and a saw support, of mechanism for moving the tooth grinder toward and from the saw support to shape the tooth of a saw on the saw support, and mechanism for moving the rotary tooth grinder in the direction of its axis after the shaping movement to trim the apex of the tooth of a saw.

18. The combination with a rotary tooth grinder, and a saw support, of a swinging frame on which the tooth grinder is journaled, mechanism for swinging the frame to cause the grinder to shape the tooth of a saw on the saw support, mechanism for moving the grinder in the direction of its turning axis after the shaping movement to trim the apex of the tooth.

19. The combination with a rotary tooth grinder, and a saw support, of a swinging frame on which the tooth grinder is journaled, a cam shaft, a lever connected to the swinging frame, a cam on the cam shaft for operating the lever, a slide in which the shaft of the rotary grinder turns, and a cam on the cam shaft coöperating with the slide to move the tooth grinder in the direction of its axis.

20. The combination with a rotary tooth grinder, a shaft by which it is carried and a saw support, of mechanism for moving the tooth grinder to shape teeth of a saw on the saw support, a slide in which the shaft of the tooth grinder turns, and a cam coöperating with the slide to move the grinder and its shaft axially after the shaping movement of the grinder to trim the apex of the tooth.

21. The combination with a saw support, and a grinder, of mechanism for moving the grinder toward and from a saw on the support having provision causing every alternate movement toward the saw to be shorter than the other.

22. The combination with a saw support, and a grinder, of a support on which the grinder is movably mounted, and mechanism for moving the support embodying a cam having alternately arranged portions producing alternate long and short movements of the grinder toward a saw on the saw support.

23. The combination with a saw support, and a tooth grinder, of mechanism for moving the grinder toward and from the saw having provision causing every alternate movement toward the saw to be smaller than the others, and every alternate smaller movement to be smaller than the other smaller movements.

24. The combination with a saw support, and a rotary tooth grinder, of a support for the grinder, mechanism for moving the grinder support toward and from the saw support, having provision causing every alternate movement toward the saw support to be smaller than the others, and means for shifting the grinder in the direction of its axis during the smaller movements.

25. The combination with a saw support, a grinder support, and a grinder rotatably mounted thereon, of mechanism for moving the grinder support toward and from the saw support embodying a cam having provision for causing every alternate movement of the support to be smaller than the others, and means for moving the grinder in the direction of its axis on the smaller movements.

26. The combination with a saw support, of a pair of beveling grinders, and automatically operating means for moving said grinders successively toward opposite sides of a saw held by the support to grind opposite sides of the tooth on the saw.

27. The combination with a saw support, of a pair of rotary beveling grinders, and automatically operating means for moving said grinders successively toward opposite sides of a saw held by the support in order to grind opposite sides of a tooth of the saw.

28. The combination with a saw support, of a pair of rotary beveling grinders to operate on opposite sides of a tooth on a saw held by the support, a reciprocatory slide on which both of said grinders are carried and means for moving the slide intermittently in the direction parallel to the plane of rotation of the grinders.

29. The combination with a saw support, of a pair of rotary beveling grinders to operate on opposite sides of a tooth on a saw held by the support, a slide by which said grinders are carried, devices for adjusting the grinders toward and from each other on the slide and means for moving the slide.

30. The combination with a saw support, of a tooth shaping grinder, mechanism for moving said grinder to successively shape each tooth of a saw held by the support, a beveling grinder adapted to chamfer the edge of a saw tooth by cutting across the edge of the saw plate, and mechanism automatically actuated relatively to the shaping grinder for causing said beveling grinder to operate only on alternate teeth of the saw on the saw support.

31. The combination with a saw support, of a tooth shaping grinder, mechanism for moving said grinder to successively shape each tooth of a saw held by the saw support, a pair of beveling grinders adapted to chamfer opposite sides of a tooth, and mechanism automatically actuated relatively to the movement of the shaping grinder for causing the beveling grinders to be shifted to operate on opposite sides of alternate teeth of the saw on the saw support.

32. The combination with a rotary saw support, and means for rotating the saw support step-by-step, of a rotary tooth shaping grinder, mechanism for moving said grinder to successively shape each tooth of a saw held by said support, a pair of rotary beveling grinders for chamfering opposite edges of a saw held by the support, and mechanism actuated in timed relation to every alternate movement of the saw support and the shaping grinder to cause said beveling grinders to operate only on alternate teeth of the saw.

33. The combination with a saw support, and means for moving the saw support step-by-step, of a pair of rotary beveling grinders to operate on opposite sides of a tooth, a slide by which said grinders are carried, and a cam shaped to move the slide to cause one grinder to engage with one side of a tooth, then to cause the other grinder to engage the other side of a tooth and finally to permit the feeding of the saw.

34. The combination with a rotary saw support and means for rotating the saw support step-by-step, of a post adjustable toward and from the saw support, a slide movable on the post, a beveling grinder on the slide, a shaft journaled in the post, a cam on the shaft for operating the slide, and a rotary bearing piece for the shaft permitting the latter to shift with the post.

ROY B. DOW.

Witnesses:
 HARROLD H. SIMNES,
 RUSSELL B. GRIFFITH.